(12) United States Patent
Stevens

(10) Patent No.: US 7,832,763 B2
(45) Date of Patent: Nov. 16, 2010

(54) RELEASABLE TETHER RETENTION SYSTEM

(75) Inventor: Bruce A. Stevens, Oakland, MI (US)

(73) Assignee: TK Holding, Inc., Armada, MI (US)

(*) Notice: Subject to any disclaimer, the term of this patent is extended or adjusted under 35 U.S.C. 154(b) by 119 days.

(21) Appl. No.: 12/005,856

(22) Filed: Dec. 28, 2007

(65) Prior Publication Data
US 2008/0157512 A1 Jul. 3, 2008

Related U.S. Application Data

(60) Provisional application No. 60/877,452, filed on Dec. 28, 2006.

(51) Int. Cl.
*B60R 21/16* (2006.01)
(52) U.S. Cl. .................. 280/743.2; 30/180; 30/DIG. 4; 83/639.1
(58) Field of Classification Search ............... 280/743.2; 30/DIG. 4, 180; 83/639.1–639.7
See application file for complete search history.

(56) References Cited

U.S. PATENT DOCUMENTS

| | | | |
|---|---|---|---|
| 5,249,825 A | 10/1993 | Gordon et al. | 280/743 |
| 5,887,894 A * | 3/1999 | Castagner et al. | 280/743.2 |
| 6,168,193 B1 * | 1/2001 | Shirk et al. | 280/730.2 |
| 6,454,300 B1 | 9/2002 | Dunkle et al. | 280/742 |
| 6,648,371 B2 | 11/2003 | Vendely et al. | 280/739 |
| 6,932,384 B2 * | 8/2005 | Waid et al. | 280/739 |
| 2005/0212273 A1 | 9/2005 | Thomas et al. | 280/739 |
| 2006/0284404 A1 * | 12/2006 | Green et al. | 280/743.2 |
| 2008/0106073 A1 * | 5/2008 | Garner et al. | 280/728.2 |
| 2008/0238050 A1 * | 10/2008 | Green et al. | 280/728.3 |

* cited by examiner

*Primary Examiner*—Ruth Ilan
(74) *Attorney, Agent, or Firm*—L.C. Begin & Associates, PLLC.

(57) ABSTRACT

A releasable tether retention system is provided. The system includes a housing, a cutting member slidably coupled to the housing, and a tether holder secured to the tether for attaching a tether to the housing. At least a first portion of the tether holder is coupled to the housing along a path of sliding motion of the cutting member so as to enable the cutting member to at least partially sever the tether holder during sliding motion of the cutting member. A vehicle occupant protection system and an airbag module including the releasable tether retention system are also disclosed.

8 Claims, 2 Drawing Sheets

US 7,832,763 B2

RELEASABLE TETHER RETENTION SYSTEM

CROSS-REFERENCE TO RELATED APPLICATIONS

This application claims the benefit of provisional application Ser. No. 60/877,452 filed on Dec. 28, 2006.

BACKGROUND OF THE INVENTION

Airbags and other pliable and inflatable restraints are being designed using releasable tethers to selectively modify the shape of the restraint, to provide the restraint with enhanced rigidity, to control venting of the restraint during deployment. At some point during or after deployment of the inflatable device, it is frequently necessary to release the tether so that it no longer restrains the inflatable device.

The present invention provides a releasable tether retention system designed to retain at least one end of an extensible tether and to release the tether upon application of an electrical actuation pulse to a standard initiator, or squib.

SUMMARY OF THE INVENTION

The present invention provides a releasable tether retention system including a housing, a cutting member slidably coupled to the housing, and a tether holder secured to the tether for attaching a tether to the housing. At least a first portion of the tether holder is coupled to the housing along a path of sliding motion of the cutting member so as to enable the cutting member to at least partially sever the tether holder during sliding motion of the cutting member.

DETAILED DESCRIPTION

Figure 1:
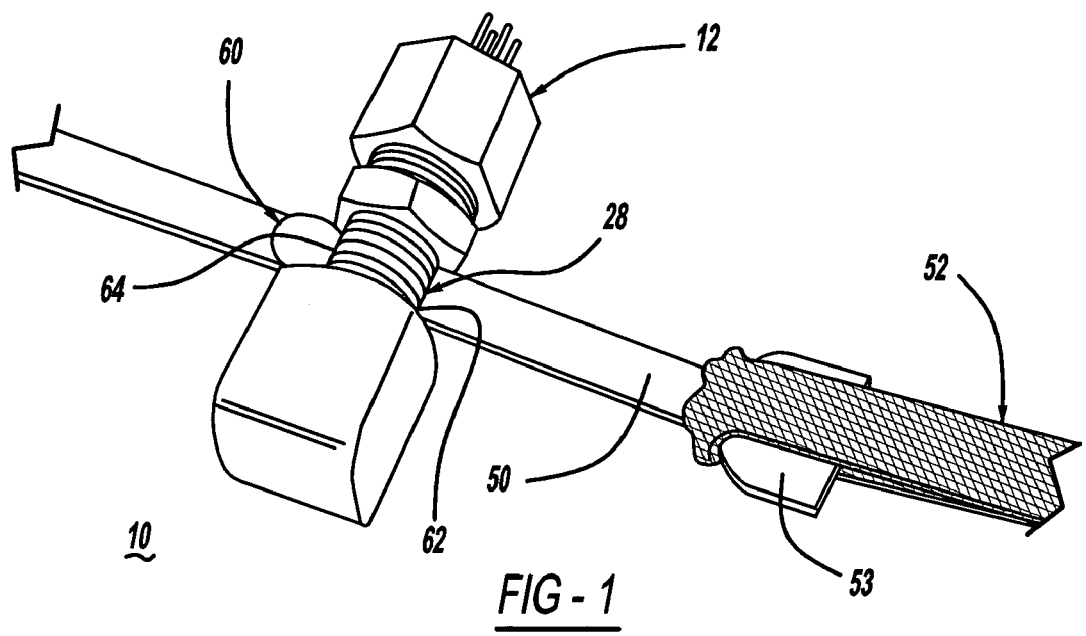
FIG. 1 is a plan perspective view of a releasable tether retention system in accordance with one embodiment of the present invention.

Referring to FIG. 1, a releasable tether retention system 10 in accordance with one embodiment of the present invention includes a cutter assembly, generally designated 12, a tether holder 50 coupled to an end of an extendible tether 52 of known construction and extending through the cutter assembly, and a tether retaining member 53 secured to tether holder 50 for securing the tether with respect to cutter assembly 12.

Figure 2:
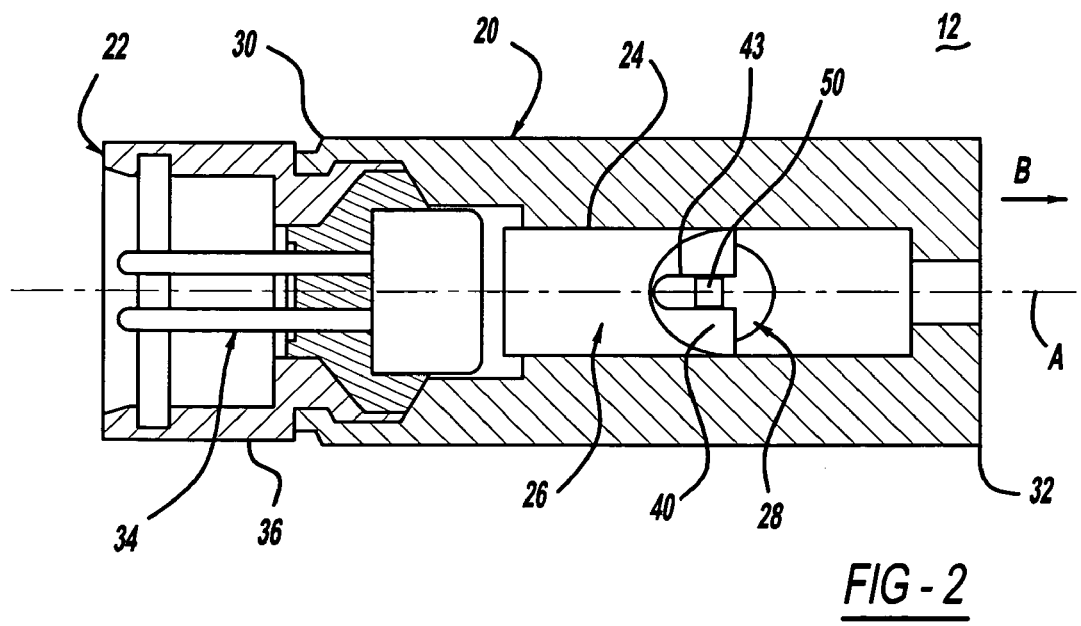
FIG. 2 is a cross-sectional view of a cutter assembly incorporated into the releasable tether retention system of FIG. 1.

Referring to FIGS. 1 and 2, cutter assembly 12 includes a housing 20 having a first open end 30 and a second end 32 opposite first end 30. An axial bore 24 extends through housing 20 between first end 30 and second end 32. A through hole 28 extends through the housing substantially perpendicular to a longitudinal housing axis A. Hole 28 intersects bore 24. Housing 20 may be extruded, machined, or otherwise metal formed and may be made from carbon steel or stainless steel, for example.

An initiator assembly 22 is secured to housing first end 30 and extends into bore 24. Initiator assembly 22 includes an electrically-actuated pyrotechnic initiator, or squib, 34 secured within a bore seal 36. Initiator 34 may be formed as known in the art. One exemplary initiator construction is described in U.S. Pat. No. 6,009,809, herein incorporated by reference. Bore seal 36 may be stamped, extruded, cast, machined, or otherwise metal formed and may be made from carbon steel or stainless steel, for example. Initiator 34 may be secured within bore seal using any of a variety of known methods including, but not limited to, an interference fit, adhesive application, or crimping. Similarly, bore seal 36 may be secured to housing 20 using any of a variety of known methods including, but not limited to, crimping, welding, or adhesive application.

Figure 3:
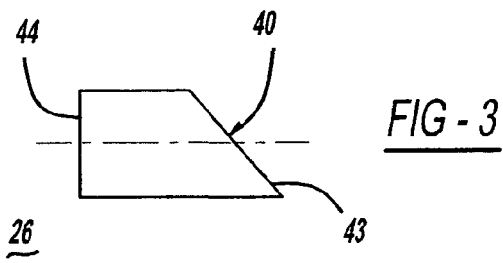
FIG. 3 is a plan view of a cutting member incorporated into the cutter assembly of FIG. 2.
Figure 4:
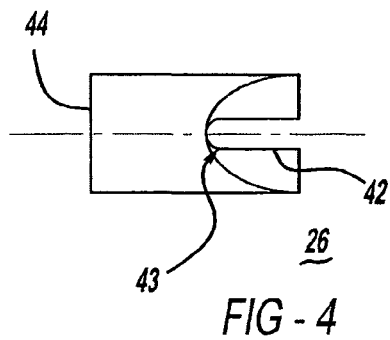
FIG. 4 is a side view of the cutting member of FIG. 3.
Figure 6:
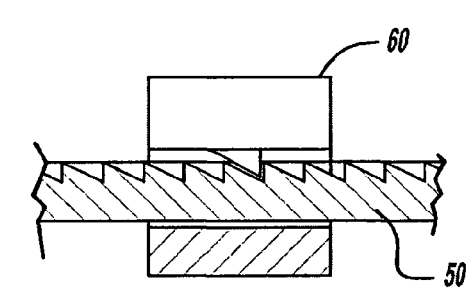
FIG. 6 is a schematic representation of an exemplary retainer portion.

Referring to FIGS. 2-4, a cutting member 26 is slidably positioned in housing bore 24 so as to enable fluid communication with initiator 34 upon activation of cutter assembly 12. In the embodiment shown, cutting member 26 includes an angled face 40 and a bearing surface 44 formed opposite angled face 40. A slot 42 extends along a portion of the cutting member for receiving therein and orienting tether holder 50 (described in greater detail below) extending into housing 20 through hole 28. Also, in the embodiment shown in FIGS. 3 and 4, slot 42 terminates in a cutting edge 43 formed in the cutting member for severing the tether holder in a manner described in greater detail below. Alternative forms of cutting edges may be incorporated into the cutting member according to design requirements. Cutting member 26 may be machined or otherwise metal formed and may be made from carbon steel or stainless steel, for example.

Referring again to FIG. 1, tether holder 50 is secured to an end of tether 52, to enable releasable securement of an end of the tether to cutter assembly 12. Tether 52 may be secured to holder 50 using any of a variety of methods. In one embodiment, a portion of tether 52 is secured about an oversized portion of holder 50 which forms a tether retaining member 53. Retaining member 53 is molded, formed, or otherwise secured proximate an end of holder 50. In another embodiment, a loop is formed proximate the end of holder 50 to permit an end of tether 52 to pass therethrough for securement thereto. Other methods of securing tether 52 to holder 50 are also contemplated. Holder 50 may be formed from a polymer material (such as nylon), from a metal or metal alloy, or from other suitable materials. In the embodiment shown in FIG. 1, holder 50 is fed into a first side 62 of housing 20 and through hole 28 in housing 20, such that an end portion of the holder extends out of a second side 64 of the housing opposite side 62.

Referring again to FIG. 1, a retainer portion or head 60 is provided to secure the portion of holder 50 extending from housing second side 64. Retainer head 60 is sized so as to prevent passage of the retainer head through housing hole 28, thereby securing a portion of the tether within housing 20 when the retainer head is secured to holder 50. Retainer head 60 is secured to holder 50 using any of a variety of suitable methods. For example, a tooth-and-pawl system similar to that used in plastic cable ties may be used. Alternatively, the retainer head may be in the form of a push nut or other suitable hardware, with holder 50 structured to engage the hardware to secure the retainer head in position along the tether holder. In another embodiment, retainer head 60 is formed into the structure of holder 50 by melting or otherwise suitably deforming a portion of holder 50 after insertion of the holder into hole 28. In yet another embodiment, the retainer portion resides in an interior of the housing and engages an interior surface of the housing to prevent withdrawal of tether holder 50 from the housing. Other methods of securing retainer head 60 to holder 50 are also contemplated.

Cutter assembly 12 may be secured to an airbag module reaction can or to another portion of a vehicle using any of a variety of known methods including, but not limited to, tabs, fasteners, rivets, snaps, welds, and/or adhesive application.

Operation of the cutter assembly 12 will now be discussed with reference to FIGS. 2-4.

Prior to activation of the cutter assembly, cutting member 26 may be secured in a position proximate initiator 34 using any of a variety of known methods including, but not limited to, an interference fit a wall of housing bore 24, a shear pin, or adhesive application. A portion of tether holder 50 resides within slot 42, proximate the open end of the slot, to ensure alignment of the holder with cutting edge 44. Upon receipt of a signal from a crash sensor, an electrical activation signal is sent to initiator 34, thereby activating the initiator. Combustion products from the initiator impinge on cutting member bearing surface 44, forcing the cutting member toward housing second end 32 (in the direction indicated by arrow "B" in FIG. 2). As cutting member 26 proceeds toward second housing end 32, cutting edge 43 completely severs tether holder 50, thereby releasing the end of tether from securement to the vehicle. Alternatively, the cutting edge may only partially sever the holder, thereby enabling the partially severed portion of the holder to completely break upon the application of an additional or predetermined tension force to the holder.

Figure 5:
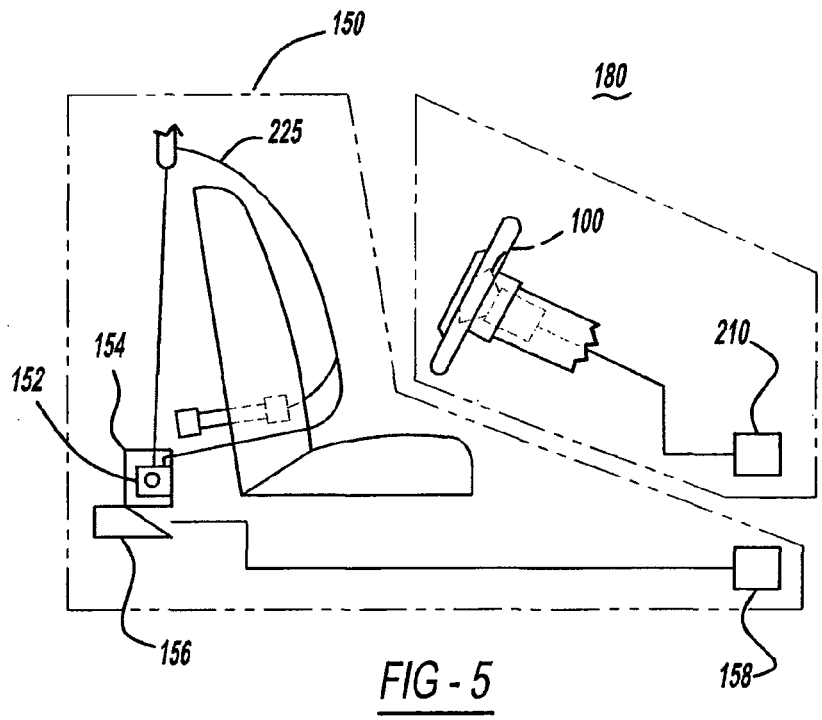
FIG. 5 is a schematic representation of an exemplary vehicle occupant restraint system incorporating a releasable tether retention system in accordance with the present invention.

FIG. 5 shows a particular application of a releasable tether retention system in accordance with the present invention. Referring to FIG. 5, the releasable tether retention system is incorporated into a driver side airbag module 100 mounted in a steering column of a vehicle. Airbag module 100 or any of the gas generating system embodiments described above may also be incorporated into a broader, more comprehensive vehicle occupant protection system 180 including additional elements such as, for example, a safety belt assembly 150. FIG. 5 shows a schematic diagram of one exemplary embodiment of such a restraint system. Airbag module 100 may be in operable communication with a crash event sensor 210 which is in communication with a known crash sensor algorithm that signals actuation of airbag module 100 via, for example, activation of igniter 34 (FIG. 2) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

The releasable tether retention system described herein offers several advantages over existing tether control systems. The cutting assembly is a relatively simple, pre-assembled design, permitting a squib to be used for actuation of the device without the hazard, inconvenience, and cost of handling and assembling the numerous separate device components. In addition, the effect of tether load on performance of the tether release mechanism is negligible.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A releasable tether retention system comprising:
    a housing;
    a cutting member slidably coupled to the housing;
    a tether holder secured to a tether for attaching the tether to the housing, at least a first portion of the tether holder being coupled to the housing along a path of sliding motion of the cutting member so as to enable the cutting member to at least partially sever the tether holder during sliding motion of the cutting member,
    wherein the tether holder includes a retainer portion for engaging the housing to retard motion of the tether holder in a first direction with respect to the housing, wherein a plurality of teeth are formed along the tether holder, and wherein the retainer portion includes a pawl formed thereon for engaging the teeth formed on the tether holder.

2. The tether retention system of claim 1 further comprising;
    a squib coupled to the housing so as to enable fluid communication between the squib and the cutting member upon activation of the squib, wherein, upon activation of the squib, combustion products resulting from activation of the squib impinge upon the cutting member to produce sliding movement of the cutting member.

3. The tether retention system of claim 1 wherein the cutting member includes a slot for receiving a portion of the tether holder therein.

4. The tether retention system of claim 3 wherein a portion of the slot is defined by a cutting edge adapted for severing the portion of the tether holder received in the slot.

5. The tether retention system of claim 1 wherein the first portion of the tether holder resides in an interior of the housing.

6. The tether retention system of claim 1 wherein the retainer portion resides exterior of the housing.

7. A vehicle occupant protection system comprising a releasable tether retention system in accordance with claim 1.

8. An airbag module comprising a releasable tether retention system in accordance with claim 1.

* * * * *